March 23, 1965   A. L. JAMES   3,175,026
EXTRUSION METHOD AND APPARATUS
Filed March 21, 1958
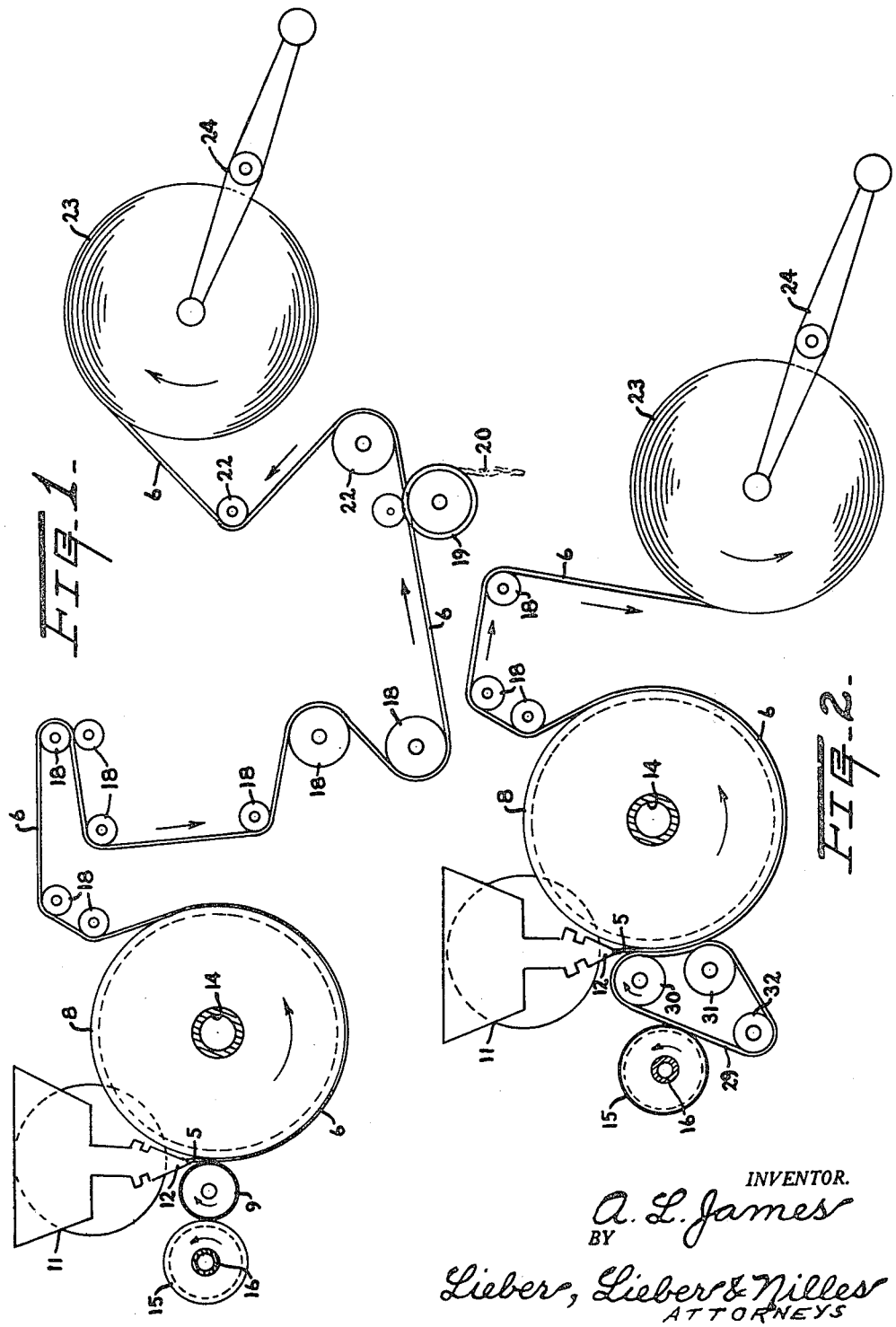
INVENTOR.
A. L. James
BY
Lieber, Lieber & Nilles
ATTORNEYS

United States Patent Office 3,175,026
Patented Mar. 23, 1965

---

3,175,026
EXTRUSION METHOD AND APPARATUS
Albert L. James, Port Washington, Wis., assignor, by mesne assignments, to National Distillers and Chemical Corporation, New York, N.Y., a corporation of Virginia
Filed Mar. 21, 1958, Ser. No. 723,040
6 Claims. (Cl. 264—210)

The present invention relates generally to improvements in the art of producing sheet material, and relates more particularly to improvements in the extrusion of relatively thin unsupported films of thermoplastic material.

A primary object of the invention is to provide an improved method of and apparatus for extruding webs of thermoplastic material in an exceedingly rapid and highly efficient manner and at exceptionally low cost.

Heretofore, it has been common practice to produce films of thermoplastic material by extruding the material in heated plastic condition through a slit die to form a flat sheet, the film being thereafter cooled by passing it through a water bath, by subjecting it to a cool air stream, or by passing it over a cool mandrel or about a cooled roll or rolls to solidify and set the same and being subsequently treated where necessary for ink receptivity, clarity or the like. In such methods of producing thermoplastic films, the water carryover when a cooling bath is used limits the speed of advancement and rewind, and when an air stream or a cooled roll or drum are used, it is difficult to maintain uniform film thickness. Furthermore, with a cooling mandrel or drum, air frequently becomes trapped between the cooling cylinders and the hot, highly plastic film to thereby cause sagging and bagginess, uneven cooling and setting and undesirable wrinkling and puckering of the film.

In the production of certain thermoplastic films, it has also been proposed to extrude the same from a circular die and to form an air bubble within the extruded tube to draw the material to the desired dimensions and gauge, the film being cooled by air and subsequently treated as necessary, slit longitudinally and then wound up into a roll. In such instances, the air cooling operation is undesirably slow, and the equipment for performing the same requires considerable space. It is additionally extremely difficult if not impossible to maintain the desired gauge control, the clarity of the film is generally not as good as desired, and a wide size range of circular dies are necessary.

Also, it has been proposed to produce film by extruding a tube into air and then drawing it about or through a circular mandrel which has a matte finish and is cooled and of a given diameter somewhat larger than the diameter of the die, the film being again subsequently treated when necessary and longitudinally slit and wound. However, this process is undesirably slow due to the friction created in passing the tube over or through the mandrel, a wide size range of dies are again necessary, a similarly wide range of mandrels are required, and the resultant film frequently has a marred finish.

It is therefore a more specific object of the present invention to provide an improved method of and apparatus for producing flexible sheets or films of thermoplastic material which obviates the objections heretofore attendant prior methods and apparatus.

Another specific object of this invention is to provide an improved method for continuously extruding clear and uniform thermoplastic films at speeds far in excess of those heretofore believed possible and an improved apparatus for commercially exploiting the method.

Another specific object of my invention is to provide an extremely simple, novel and improved method and apparatus for producing flexible unsupported thermoplastic films of exceptionally uniform and readily controlled gauge and with a minimum number of operations.

Still another specific object of the invention is to provide an improved method of and apparatus for efficiently producing unsupported thermoplastic films by extrusion while simultaneously providing the film with desired surface characteristics and clarity either with or without a pattern or design effect.

Another specific object of the invention is to provide a method of producing film having excellent physical properties such as tensile, tear and impact strength and good clarity.

A further specific object of the present invention is to provide an improved method of producing unsupported thermoplastic sheeting which comprises, extruding a curtain of unsupported thermoplastic material in substantially fluid condition into the nip formed between adjacent cooperating arcuate surfaces, forming the extruded curtain of unsupported fluid material into a sheet of uniform gauge by pulling the same from the source of extrusion toward and between the adjacent arcuate surfaces, and cooling the sheet to solidified condition while simultaneously advancing the same in surface contact over one of the arcuate surfaces.

An additional specific object of the present invention is to provide an improved apparatus for producing unsupported thermoplastic sheeting comprising, means forming a pair of adjacent opposed arcuate surfaces cooperating to provide a nip therebetween, both of the surfaces being smooth and glossy and one of them being relatively deformable, means for extruding a curtain of thermoplastic material in substantially fluid condition to the nip formed between the opposed arcuate surfaces, means for cooling at least one of the arcuate surfaces, and means for advancing the opposed arcuate surfaces at a somewhat faster rate of speed than the rate of extrusion to thereby pull the curtain of fluid thermoplastic material from the source of extrusion toward and between the opposed arcuate surfaces to form a thermoplastic sheet of uniform gauge.

These and other specific objects and advantages will become apparent from the following detailed description.

A clear conception of the several features constituting the present invention and of the steps of the improved method, as well as details of the apparatus for automatically performing such steps, may be had by referring to the drawings accompanying and forming a part of this specification wherein like reference characters designate the same or similar parts in the various views.

FIG. 1 is a more-or-less diagrammatic view illustrating one embodiment of the improved method for continuously producing unsupported thermoplastic film and typical apparatus for exploiting the same; and FIG. 2 is a similar diagrammatic view showing a somewhat modified apparatus for performing the method.

While the invention is shown and described herein as being especially advantageously applicable to the extrusion of a thermoplastic material such as polyethylene as a clear transparent and unsupported film, it should be understood that it is not intended or desired to restrict the scope or utility of the invention by reason of such limited embodiment; and it is also contemplated that certain terminology employed herein shall be given the broadest possible interpretation consistent with the disclosure.

As for the descriptive terms used herein, the phrase "unsupported" is intended to denote a sheet, film or curtain of material which is not backed, laminated or otherwise reinforced by or secured to another sheet or film. The term "substantially fluid" as used to describe the condition of the hot thermoplastic material extending from the extrusion die to the nip is intended to indicate a condition in which the material is soft and capable of being drawn, expanded or stretched to a desired gauge or thickness prior to the state in which it becomes solidified or set. As for the phrase "glazed" in defining the arcuate surfaces of the draw rolls or the cooperating draw roll and belt, it is intended that this term denote an optically smooth, glossy, relatively impervious, highly polished, or glass-like finish whether in the nature of a separate coating or film or merely a treatment of the surface of the basic material from which the body of the roll or belt is formed. With respect to the word "deformable" as applied to one of the arcuate surfaces, this term is intended to denote resiliency or the ability to change shape, flex or distort under force whether by reason of the nature of the surface itself or the supporting body for the surface, and capable of assuming its original shape.

Referring to the drawings, the several steps of the improved method of producing thermoplastic sheeting are as follows. First, a sheet or curtain of unsupported thermoplastic material heated to substantially fluid or flowable condition is extruded or fed in a suitable manner, as at 5, toward and into the nip formed between adjacent opposed cooperating arcuate surfaces. Next, the extruded unsupported curtain 5 of thermoplastic material while in substantially fluid condition is drawn to uniform gauge or thickness as a self-supported film by simultaneously advancing the arcuate surfaces at a somewhat higher peripheral rate of speed than the rate of extrusion to thereby pull or draw the extruded curtain 5 of thermoplastic material from the source of extrusion toward and between the adjacent arcuate surfaces. The sheet or film 6 thus formed is then immediately cooled to solidified and set condition by advancing the same in intimate surface contact with one of the arcuate surfaces which is constantly cooled in a suitable manner as will hereinafter more fully appear. This advancement of the film 6 in surface contact with the arcuate surface while simultaneously cooling the same is continued for a sufficient distance to set the thermoplastic material, and the sheet is then withdrawn from the arcuate surface, suitably trimmed if necessary, and finally wound in a roll for subsequent use.

To impart a high degree of transparency and clarity to the sheet or film 6 as it is thus formed, I have discovered that both of the arcuate sheet-contacting surfaces should be optically smooth and glazed with no surface irregularities or blemishes. Also, to insure a uniform pull or draw transversely across the curtain 5 toward and between the arcuate surfaces while compensating for any possible irregularities in the contour of the surfaces, it is preferable to form one of the arcuate surfaces of a hard material such as stainless steel or other metal having a highly polished and mirror-like finish with the opposed arcuate surface being formed of a relatively deformable material such as silicone rubber or neoprene coated and/or polished to impart a hard, glossy, mar resistant and temperature resistant finish thereto. In addition, the materials from which the arcuate surfaces are formed should be selected for their ability or should be treated to release from the thermoplastic material under treatment, and these surfaces should not have an affinity for the thermoplastic. The gauge or thickness of the film 6 may be varied as desired by adjusting the speed of advancement of the arcuate surfaces relative to the rate of feed or extrusion of the material to the nip or vice versa to thereby vary the amount of stretch or rate at which curtain 5 of thermoplastic material is drawn toward and between the arcuate surfaces. Also, to insure release of the web from both arcuate surfaces, it is desirable to cool both surfaces and quickly set the thermoplastic material and to intimately contact the web with one of the arcuate surfaces for an extended portion of its travel during the cooling operation.

In the embodiment of the apparatus for performing the improved method as shown in FIG. 1, the adjacent opposed arcuate surfaces are formed by a driven metallic cylinder or drum 8 and a cooperating draw roll or roller 9 which is either freely rotatable with the drum 8 or is adapted to be independently driven simultaneously therewith and at the same peripheral speed in opposite directions as indicated by the arrows. In this embodiment, the cylinder 8 is formed of any suitable hard and temperature resistant material such as stainless steel or the like with the peripheral surface of the cylinder being highly polished or chrome plated to an optically smooth mirror-like and glossy finish, and at least the peripheral surface portion of the back-up or draw roll 9 is formed of a suitable relatively deformable material such as silicone rubber or neoprene coated or otherwise treated to also render the same optically smooth and glossy. The curtain 5 of thermoplastic material in substantially fluid condition is fed toward the nip formed between the opposed arcuate surfaces from the die or head 12 of a suitable extruder 11, the die 12 being provided with the customary discharge slit and the extruder being readily controllable to vary the rate of feed or extrusion, and it has been found desirable to extrude the curtain on to the cooled arcuate metallic surface of the drum 8 and then to the nip in actual practice to quickly cool the film. The metallic cylinder 8 is hollow and may be provided with a hollow shaft 14 providing an inlet at one end and an outlet at the other end of the cylinder for circulating a cooling liquid interiorly thereof to thereby cool the peripheral film carrying surface. It is also desirable to cool the periphery of the back-up roll 9, and for this purpose, a hollow cooling roll 15 likewise having a hollow shaft 16 for circulating cooling fluid therein is provided, the periphery of the cooling roller 15 being adapted for peripheral engagement with the back-up roll 9 as shown. In addition, the back-up roll itself may be internally cooled in a similar manner. As indicated, suitable means may be provided for simultaneously rotating the cylinder 8 and roll 9 at the same peripheral speed, and means may be provided for suitably controlling the speed thereof relative to the rate of feed from the extrusion die 12. It should be further noted that the trimming device may be located in any desired convenient place beyond the cylinder 8, and the trimmed material or bead trim may be removed by suction or the like.

The curtain 5 of thermoplastic material is fed through the slit in the extrusion die 12 at a given rate of speed and as a continuous sheet of a width dependent upon the length of the slit in the extrusion die. Since the thermoplastic material thus fed from the extrusion die 12 in the nip formed between the drum 8 and roller 9 is in heated and substantially fluid condition, the cylinder 8 and roller 9 when driven at a faster peripheral rate of speed than the rate of feed of the material from the die 12 will pull the curtain 5 away from the die and will draw the same to a uniform gauge or thickness dependent upon the relative speeds of the cylinder 8 and roller 9 to the rate of feed from the extrusion die. As the sheet or film 6 thus formed is cooled by the peripheral surface of the internally cooled cylinder 8, the thermoplastic material will become stable and set to solidified condition, and as shown in the drawing, the film 6 is advanced in intimate contact with the cool peripheral surface of the cylinder 8 for a considerable distance during its travel to thereby completely set the film and insure its ready release from the cooling cylinder. The film 6 is then withdrawn from the cooling cylinder 8 about a series of suitable guide rolls 18 some of which may be driven in a well-known manner to aid in the advancement of the film. From the guide rolls 18, the film may be advanced between a pair of circular trimming knives 19 or the like if necessary and desired to trim the marginal side edge portions thereof, the trimmed material 20 being suitably disposed of. From the trimming knives 19, the film 6 is advanced about suitable guide rolls 22 and is finally wound in a roll 23 supported on a suitable spindle reel 24 from which it may be dispensed for subsequent use.

The slightly modified apparatus shown in FIG. 2 is substantially like that of FIG. 1 except for the substitution of an endless back-up belt 29 for the back-up or draw roll 9. In the modified device, a curtain 5 of thermoplastic material in substantially fluid condition is again fed from the die 12 of an extruder 11 at a given rate of speed to the nip formed between the hollow internally cooled cylinder 8 and the cooperating belt 29. The cylinder 8 and belt 29 are simultaneously driven either independently or by surface contact with one or the other which may be driven, and these members are advanced at a somewhat higher peripheral rate of speed than the rate of extrusion of the material from the die to again pull the curtain 5 away from the die toward and between the periphery of the cylinder 8 and belt 29 to form a film 6 of desired uniform gauge. The belt 29 is driven about the rollers 30, 31, 32 so as to back up the film 6 for an extended portion of its travel about the periphery of the cooling cylinder 8, and a hollow internally cooled roll or drum 15 may again be provided for constantly cooling the surface of the belt 29 so as to prevent overheating thereof, the roll 15 preferably being located intermediate the rollers 30, 32 or 31, 32 so as to permit adjustment of belt tension by movement of the roll 15 toward or away from the belt. From the periphery of the cooling cylinder 8, the solidified and set film 6 may again be guided over a series of guide rolls 18 to the spindle reel 24 where it is wound in a roll 23 for subsequent use. If desired, suitable trimming knives 19 (FIG. 1) may again be provided for removing the marginal bead, and these knives may be suitably located as above indicated. The use of the belt 29 as a backing or cushioning member results in the extension of the length of travel time of the cushioning member as the film is being cooled and set, thereby more positively insuring release of the film and elimination of any possibility of sticking and wrap around.

The method and apparatus herein described as embodying the invention may be used to advantage in the production of films of inherently plastic materials such as polyethylene, Pliofilm, Saran, vinyl films, nylon films, polyesters, cellulose acetate, cellulose acetate butyrate, ethyl cellulose, and polystyrene. With regard to the cylinder 8, any material capable of being fabricated into a suitable cooling cylinder and capable of being polished or otherwise treated to substantially optical smoothness and having sufficient heat resistance and no deleterious effect upon the particular thermoplastic material being processed may be satisfactorily utilized, and while highly polished chrome plated steel drums or cylinders have been indicated herein as being preferably used, they may nevertheless be fabricated of nickel, brass, bronze or titanium. As for the draw roller 9, surface thereof may be formed of any resilient or deformable material which is not effected adversely by the heat of the thermoplastic material under treatment and should be selected from materials which do not have an affinity for the thermoplastic material being processed, and while a metal belt may be used in the modification of FIG. 2, means should be provided in such instances for permitting the belt to readily flex or deform.

Again, the material from which the roll 9 is formed should be capable of treatment such as will result in an optically smooth surface, and while silicone rubber and neoprene have been indicated herein as being advantageously utilized, it is possible in some instances to also use certain lacquers and enamels, nylon, polyvinyl alcohol, Mylar, Teflon, silicone resins and perhaps other materials. If the method and apparatus are to be used in the production of a translucent matte finish thermoplastic film rather than a clear transparent film as described, the surface of the cylinder 8 may be roughened as by sand blasting, and it is only necessary to grind the back-up or draw roll 9 to a smooth but lusterless finish rather than a glossy surface. The cylinder 8 may be internally cooled in any suitable known manner by circulating water, brine, glycol or the like therethrough to effect the highest possible degree of cooling in order to cause setting of the film 6 as it travels over the arcuate periphery of the cylinder.

The following is an example of the procedure for producing a clear, transparent, glossy finish polyethylene film of 1½ mils thickness at the rate of 200 feet per minute. The thermoplastic material selected is a polyethylene resin identified as Alathon 22A from E. I. du Pont de Nemours & Co. having a melt index 3, a density of 0.921 and a molecular weight of 21,000. An Eagan extruder having a 20 to 1 barrel length to barrel diameter with the barrel divided into three heating zones with the adapter section having separately controlled heating means and with a die having a 23 inch long slit is used. The temperature settings range from 400° F. in zone 1 of the barrel to 525° F. in zone 3 of the barrel as well as in the adapter and approximately the same in the die so that the stock temperature as it extrudes from the die is approximately 525° F. The die gap is set at 30 mils and the screw speed set at 48 r.p.m. An internally cooled cooling cylinder 24 inches in diameter having a polished mirror-like finish chrome plated surface is used in conjunction with a back-up or draw roll of steel covered with neoprene approximately ⅝ inch thick and having an outside diameter of 6 inches ground smooth and true and dipped in a 25% solids solution of Dow Corning No. 805 silicone varnish resin to form a .1 to .5 mil coating, the draw roll having been allowed to air dry for one hour then baked in an oven for two hours at 175° F. and then further baked for seven hours at 300° F. to provide a finish which is hard, extremely glossy, mar resistant, temperature resistant and yet flexible enough not to peel and chip in use. With the extruder screw feed set at 48 r.p.m. and with the distance from the die to the point of contact of the peripheries of the cylinder and draw roll set at 3½ inches, the cooling cylinder and draw roll are rotated at a peripheral surface speed of 200 feet per minute with the cooling roll chilled to approximately 75° F. Also, the back-up or draw roll is adjusted so as to exert a pressure of approximately 30 pounds per linear inch of the nip and the film produced may, of course, be marginally trimmed to any desired extent dependent upon the desired width of the final film. It is found that the thermoplastic stock under treatment has excellent release properties from the cooling roll and the cooperating back-up roll, and if the cooling cylinder and back-up roll are not scratched or otherwise marred, extremely good quality, clear, glossy and transparent films are produced.

An example of the procedure for producing polyethylene film having a translucent matte finish and of the same 1½ mil thickness at the rate of 200 feet per minute is as follows. A polyethylene Alathon 22 procurable from E. I. du Pont de Nemours & Co. having a melt index of 3, density of 0.921 and a molecular weight of approximately 21,000 is selected. The same extruder may be used, but the chill or cooling cylinder has a hard chrome plated sand blasted surface, and a 6" diameter silicone rubber back-up or squeeze roll having approximately ½ inch of silicone rubber covering of approximately 70 to 80 durometer silicone rubber on a steel shell and surface ground to a smooth but lusterless finish is used. The die gap setting is the same as above as is the speed setting of the extruder and the speed adjustment of the chill roll and the draw distance. Also the temperature settings are the same as above with the pressure of the rubber roll against the cooling cylinder being varied between 5 pounds and 150 pounds per linear inch of nip. The translucent matte finish and unsupported polyethylene film thus produced is of good quality and releases readily from the metal cylinder and the rubber back-up roll.

If it is desired to produce a clear transparent film having a translucent pattern design, the pattern desired may be sand blasted, embossed or otherwise scratched or impressed in the peripheral surface of either the rubber back-up roll or the cooling cylinder, or both and the same extruder and other equipment and settings of the device as hereinabove set forth may be followed. It is also apparent that the present process and apparatus are not limited to the production of polyethylene films but can also be used in the production of other thermoplastic films, and the materials selected for forming the arcuate surfaces as well as the regulation of temperature settings and control of speeds are dependent upon the material being treated and the desired final thickness of the film.

In attempting to determine the surface smoothness required by the rollers 8, 9 in order to obtain satisfactory clarity in the production of transparent sheet material, tests were made from a set of standard surface blocks made by General Electric Company for standard roughness specifications as described in General Electric Company Catalog No. 8651831G2. These blocks are made in varying degrees of smoothness, defined in terms of the maximum height of the peaks and valleys present on the surface, and the blocks are numbered according to the number of micro inches of this surface variation. Replicas of these test block surfaces were made in cellulose acetate film softened with acetane vapors, the softened film being pressed into the surface of the blocks and then removed and dried to obtain a transparent film replica of the surfaces of the blocks. Examination of these replicas held against the light permitted a determination of the degree of diffusion obtained with the various degrees of surface roughness, and replicas of blocks from 4 to 250 micro inches of surface smoothness were made. Upon examination of these films, it appears that polyethylene should possess a clarity at least equal to No. 8 as based on these tests in order to be considered satisfactory where transparent film is desired, and in such instances, the rollers 8, 9 should have a peripheral surface smoothness not rougher than 8 micro inches.

It is not desired or intended to limit this invention to the exact details of the apparatus or to the precise steps of the method herein shown and described, since various modifications within the scope of the appended claims may occur to persons skilled in the art to which this invention pertains.

I claim:

1. The method of producing unsupported thermoplastic sheeting, which comprises, extruding a curtain of unsupported thermoplastic material in substantially fluid condition directly into the nip formed between adjacent cooperating arcuate surfaces at least one of which is smooth and glossy and one of them being relatively deformable, so as to simultaneously contact both surfaces, drawing the extruded curtain of unsupported fluid material into a sheet of desired gauge by pulling the same from the source of extrusion toward and between the adjacent arcuate surfaces and withdrawing the sheet at a faster peripheral rate of speed than the rate of extrusion, and thereafter cooling the sheet thus formed to solidified condition while simultaneously advancing the same in surface contact over one of the arcuate surfaces.

2. The method of producing unsupported thermoplastic sheeting, which comprises, extruding a curtain of unsupported thermoplastic material in substantially fluid condition directly into the nip formed between adjacent opposed cooperating arcuate surfaces so as to simultaneously contact both of said surfaces, both of said surfaces being smooth and glossy and one of them being relatively deformable, advancing the arcuate surfaces at a faster peripheral rate of speed than the rate of extrusion to pull the extruded curtain of unsupported fluid material from the source of extrusion toward and between the adjacent arcuate surfaces thereby forming the same into a sheet of uniform gauge, and thereafter cooling the sheet thus formed to solidified condition while simultaneously advancing the same in intimate surface contact over one of the arcuate surfaces.

3. The method of producing single ply thermoplastic film, which comprises, extruding a curtain of unsupported thermoplastic material in substantially fluid condition directly into the nip formed between adjacent opposed cooperating arcuate surfaces both of which are optically smooth and glossy and one of which is relatively deformable, advancing the arcuate surfaces simultaneously and at a faster peripheral rate of speed than the rate of extrusion to pull the extruded curtain of unsupported fluent material from the source of extrusion toward and between the adjacent arcuate surfaces thereby forming the same into a single ply film of uniform gauge, thereafter cooling the film thus formed to solidified condition while simultaneously advancing the same in intimate surface contact over an extended area of one of the arcuate surfaces, and finally conducting the cooled and solidified sheet away from the arcuate surface.

4. The method of producing single ply thermoplastic film, which comprises, continuously extruding a curtain of unsupported thermoplastic material in substantially fluid condition at a given rate of speed directly into the nip formed between adjacent opposed cooperating arcuate surfaces one of which is optically smooth and mirror-like and relatively non-deformable and the other of which is optically smooth and glazed and relatively deformable, advancing the arcuate surfaces simultaneously and at a faster peripheral rate of speed than the rate of extrusion to pull the extruded curtain of fluent material from the source of extrusion toward and between the adjacent arcuate surfaces thereby forming the same into a single ply film of uniform gauge, and thereafter continuously advancing the film thus formed in intimate surface contact over the non-deformable arcuate surface while simultaneously cooling the same along the contacting surface thereof.

5. Apparatus for producing clear thermoplastic sheeting comprising, means forming a pair of adjacent opposed arcuate surfaces cooperating to provide a nip therebetween, both of said surfaces possessing a surface smoothness no rougher than 8 micro inches and one of said surfaces being relatively deformable, means for extruding a curtain of thermoplastic material in substantially fluid condition to the nip formed between said opposed arcuate surfaces, means for cooling at least one of said arcuate surfaces, and means for advancing said opposed arcuate surfaces at a somewhat faster rate of speed than the rate of extrusion to thereby pull said curtain of thermoplastic material from the source of extrusion toward and between said opposed surfaces to form a clear thermoplastic sheet of uniform gauge.

6. Apparatus for the production of a melt-extruded film which comprises a pair of nip rolls, one of said rolls being a rotatable, smooth-surfaced, highly polished roll, and the other being a contra-rotatable, highly polished pressure roll having a resilient surface and adapted to apply pressure at the nip formed by said rolls; means for cooling said smooth-surfaced roll; means for extruding a molten film of a thermoplastic normally solid polymer through the nip formed by said rolls and in direct contact with both said smooth-surfaced roll and said pressure roll, and means for withdrawing the molten film of thermoplastic through the rolls at a faster peripheral rate of speed than the rate of extrusion.

References Cited by the Examiner

UNITED STATES PATENTS

| | | | |
|---|---|---|---|
| 1,327,354 | 1/20 | Perry | 18—15 XR |
| 2,318,469 | 5/43 | Derby et al. | 18—15 |
| 2,582,294 | 1/52 | Stober | 18—15 XR |
| 2,607,712 | 8/52 | Sturken | 18—15 XR |
| 2,624,913 | 1/53 | Montross et al. | 18—155 XR |
| 2,638,628 | 5/53 | Stott et al. | 18—15 XR |
| 2,702,406 | 2/55 | Reed. | |
| 2,728,944 | 1/56 | Crooks | 18—15 |
| 2,728,951 | 1/56 | Hamlon et al. | 18—57 XR |
| 2,736,066 | 2/56 | Chren et al. | |
| 2,774,988 | 12/56 | Stirn et al. | 18—15 |
| 2,821,746 | 2/58 | Bicher | 18—15 |

WILLIAM J. STEPHENSON, *Primary Examiner.*

MICHAEL V. BRINDISI, ALEXANDER H. BRODMERKEL, *Examiners.*